United States Patent
Barrow et al.

(10) Patent No.: US 6,296,297 B1
(45) Date of Patent: Oct. 2, 2001

(54) BICYCLE CAMPER TRAILER

(76) Inventors: Timothy M. Barrow, 117 River Meadow; Glenn P. Barrow, P.O. Box 373, both of Castroville, TX (US) 78009

(*) Notice: Subject to any disclaimer, the term of this patent is extended or adjusted under 35 U.S.C. 154(b) by 0 days.

(21) Appl. No.: 09/383,729

(22) Filed: Aug. 26, 1999

Related U.S. Application Data (60) Provisional application No. 60/133,648, filed on May 11, 1999.

(51) Int. Cl.[7] .............................. B60P 3/35; B60P 3/355
(52) U.S. Cl. ....................... 296/173; 296/161; 296/168; 296/169
(58) Field of Search ................................ 296/161, 173, 296/168, 169

(56) References Cited

U.S. PATENT DOCUMENTS

| | | | |
|---|---|---|---|
| 4,014,586 | * | 3/1977 | Swofford ............................... 296/173 |
| 4,253,677 | * | 3/1981 | Wissler ................................. 280/40 |
| 4,256,321 | * | 3/1981 | Trulove ................................ 296/173 |
| 4,310,195 | * | 1/1982 | Huff ..................................... 296/173 |
| 4,372,568 | * | 2/1983 | Campbell ............................. 296/173 |
| 4,754,998 | * | 7/1988 | LeJuerne .............................. 296/173 |
| 5,462,330 | * | 10/1995 | Brown .................................. 296/173 |
| 6,042,175 | * | 3/2000 | Williams .............................. 296/173 |

* cited by examiner

Primary Examiner—Stephen T. Gordon
Assistant Examiner—G Blankenship
(74) Attorney, Agent, or Firm—Kilpatrick Stockton, L.L.P.

(57) ABSTRACT

A clamshell-style camping trailer adapted to be pulled by a bicycle including a wheeled chassis that has a camper compartment mounted thereupon and a tongue member coupled thereto for connection to a towing bicycle. The compartment is transformable between a traveling configuration and an open configuration. The camper compartment has at least two clamshell-styled bodies, each of which is configured to matingly engage the other for configuring the camper compartment into the traveling configuration. At least one of the two clamshell-styled bodies has a closure member for forming a separate cargo space within each of the bodies so that the bodies may be moved relative to one another without contents contained in the cargo spaces spilling therefrom. The two clamshell-styled bodies take the form of a top body and a bottom body that are adapted to establish a camping configuration when the top body is maximally pivoted with respect to the bottom body. Each of the top and bottom bodies have an upper opening when in the camping configuration that is defined by an upper lip which are both positioned substantially level with one another in the camping configuration. A tent is supported upon the tent poles for establishing an enclosure about the substantially flat sleeping deck of the camping trailer. The tent has a lower portion that is snap-secured about a top portion of the clamshell-styled bodies in the camping configuration thereby completing the tented enclosure.

40 Claims, 6 Drawing Sheets

BICYCLE CAMPER TRAILER

RELATED PATENT APPLICATIONS

This patent application claims the benefit of U.S. Provisional Application No. 60/133,648 filed May 11, 1999 entitled BICYCLE CAMPER TRAILER.

TECHNICAL FIELD

The present invention relates generally to a clamshell-style camping trailer for attachment to a towing bicycle. More specifically the trailer comprises a storage container having top and bottom shell compartments in pivotal relationship to allow them to be separated to provide a level surface that may be used as a sleeping deck. A tent cover, over the sleeping deck, provides a camping enclosure for accommodation and protection of a camper.

1. Background Art

In response to the availability of national parklands and wildlife refuges, a significant population exists of those who enjoy outdoor activities which may take them into areas remote from accommodation facilities such as hotels, motels and even chalets and cabins.

For such occasions, there is a wide range of camping options including various types of motorized campers and trailers, some of which may be pulled by using motorcycles. Such modes of transportation usually appeal to those planning to explore nature's beauty at a significant distance from their normal place of residence. For those wishing to leisurely explore natural environments closer to them there exists a wide variety of options and equipment suitable for back-packs to be carried by hikers. Another means of exploring, at a slower pace than with motorized equipment, uses the convenience of bicycling while pulling needed supplies and equipment in a trailer, suitably attached to the towing bicycle.

While many types of trailer exist as cargo storage containers, suitable for towing by bicycles, the inventor discovered the need for a compact bicycle trailer with a storage container to accommodate food, supplies and camping equipment, including a tent. A suitable folding trailer small and light enough for bicycle towing, but with sufficient internal space for storing needed camping items, including a tent structure, could not be found.

In view of the above described deficiencies associated with the use of known designs for bicycle-towed, clamshell-style camping trailers, the present invention has been developed to alleviate these drawbacks and provide further benefits to the user. These enhancements and benefits are described in greater detail hereinbelow with respect to several alternative embodiments of the present invention.

2. Disclosure of the Invention

The present invention in its several disclosed embodiments alleviates the drawbacks described above with respect to conventionally designed bicycle trailers and incorporates several additional beneficial features.

The trailer not only allows a cyclist to carry food and related supplies, but in a relatively small space, can hold a tent structure specifically designed for mounting on the trailer. The present invention is remarkable because its camping configuration having a relatively small flat surface provides sufficient area to sleep one person in a tented enclosure that allows the camper to sit in a comfortable upright seating position.

As shown, the invention takes the form of a clamshell-style camping trailer adapted to be pulled by a bicycle. In the illustrated embodiment, the camping trailer includes a wheeled chassis that has a camper compartment mounted thereupon and a tongue member coupled thereto for connection to a towing bicycle. The compartment is transformable between a traveling configuration and an open configuration. The camper compartment has at least two clamshell-styled bodies, each of which is configured to matingly engage the other for configuring the camper compartment into the traveling configuration. At least one of the two clamshell-styled bodies has a closure member for forming a separate cargo space within each of the bodies so that the bodies may be moved relative to one another without contents contained in the cargo spaces spilling therefrom.

The closure member includes a friction-fit securement that is configured to releasably attach the closure member to the camping trailer. A substantially rigid brace extends across an open portion of at least one of the two clamshell-styled bodies for resisting deflection of the bodies. In one embodiment, the friction-fit securement is configured to releasably attach the closure member to the brace.

At least one hinge is connected between the two clamshell-styled bodies so that one may be pivoted away from the other when being transformed from the traveling configuration to the open configuration.

An L-shaped angle brace is positioned interiorly within one of the cargo spaces at a back side wall of at least one of the two clamshell-styled bodies substantially adjacent to the hinge. In the illustrated embodiment, there is such a brace in each of the bodies. An exterior surface of a vertical leg of the L-shaped angle brace is positioned flush with an interior surface of at least one of the two clamshel-styled bodies and a top surface of a horizontal leg of the L-shaped angle brace is positioned level with an upper lip of at least one of the two clamshell-styled bodies. The top surface of the horizontal leg of the brace constitutes a portion of a support surface upon which a substantially flat sleeping deck is supported in the camping configuration.

The at least two clamshell-styled bodies take the form of a top body and a bottom body that are adapted to establish a camping configuration when the top body is maximally pivoted with respect to the bottom body. Each of the top and bottom bodies have an upper opening when in the camping configuration that is defined by an upper lip which are both positioned substantially level with one another in the camping configuration.

The top body has a height greater than a height of the bottom body. The bottom body is supported on the wheeled chassis in the camping configuration and the top body is supported on an adjacent ground surface in the camping configuration. The heights of the top and bottom bodies are selected so as to maintain each of the upper lips substantially level with one another in the camping configuration.

The top body includes a recess at a back portion thereof and the recess is configured to releasably receive a back light assembly. For use, a back light assembly is insertably received in the recess which is sized to form a friction fit with the back light assembly when the back light assembly is installed therein.

Each of the top and bottom bodies has at least one reinforcing rib positioned exteriorly thereof for resisting deflections in the bodies. The ribs on each of the bodies are arranged to abuttingly engage one another when in the camping configuration for setting a degree of pivotation between the bodies that causes the substantially level orientation of the upper lips of the top and bottom bodies.

Preferably, each of the closure members take the form of a substantially planar cover that may be suitably constructed from plywood or similar sheeting. Each of the covers are adapted together to form the substantially flat sleeping deck when the top and bottom bodies are in the camping configuration. A periphery of at least one of the covers is shaped to conform to a shape of a mouth formed by the upper lip of one of the bodies upon which the cover is attached so that the cover is supported at the periphery on the mouth in the camping configuration. In this manner and orientation, the rigid brace that extends across the mouth of one of the bodies and presents an upper support surface that abuttingly engages the cover for lending additional support thereto in the camping configuration.

At least one of the mouths includes a flange that projects beyond the periphery of the planar covers so that both covers are located interiorly to an external periphery of the flange in both the travel configuration and the camping configuration. A lock assembly is at least partially contained in the flange for releasably locking the two clamshell-styled bodies in the traveling configuration.

The tongue member is telescopically constructed to facilitate raising and lowering of a top portion of the tongue member to establish proper positioning of the top portion for attachment to a towing bicycle.

The top body has an access hatch for permitting access to the cargo space within the top body in both the traveling configuration and the open configuration. A hatch door is provided for covering the access hatch and a pouch is located interiorly of the access hatch. The pouch has a mouth positioned about the access hatch and the pouch forms a separate pouch space within the cargo space of the top body. The pouch includes a second opening opposite the access hatch for providing access into the pouch space from within the cargo space of the top body. A zipper closure is provided at the second opening for selectively closing and opening the second opening from within the cargo space of the top body.

At least one tent pole, and preferably two tent poles are coupled to the camping trailer for supporting a tent above the camping trailer in the camping configuration. A tent pole receiver is coupled to the clamshell-styled bodies and the receiver is configured to secure a tent pole to the bodies for supporting a tent cover above the clamshell-style camping trailer in the camping configuration. The tent pole receiver is coupled to the clamshell-styled body by a pivot connection that enables transformation of the tent pole receiver between a substantially upright configuration for receiving the tent pole and a stored configuration assumable when the tent pole receiver is not in use. Each of the tent poles has two end portions, each of which are received in a tent pole receiver on the camping trailer. A mid-section of each tent pole is arched over the camping trailer thereby forming a rib structure for supporting a tent above the camping trailer in the camping configuration. A constricting member is preferably coupled to one or more of the tent poles. The constricting member is configured and applied upon the tent poles to bow them outwardly thereby increasing an interior space of a tent supported thereupon.

As shown, a tent is supported upon the tent poles for establishing an enclosure about the substantially flat sleeping deck of the camping trailer. The tent has a lower portion that is snap-secured about a top portion of the clamshell-styled bodies in the camping configuration thereby completing the tented enclosure.

The clamshell-styled bodies may also be referred to herein as top and bottom bodies upper and lower shells and molded shells, and molder shells.

The beneficial effects described above apply generally to the exemplary devices and mechanisms disclosed herein of the clamshell-style camping trailer. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Figure 1:
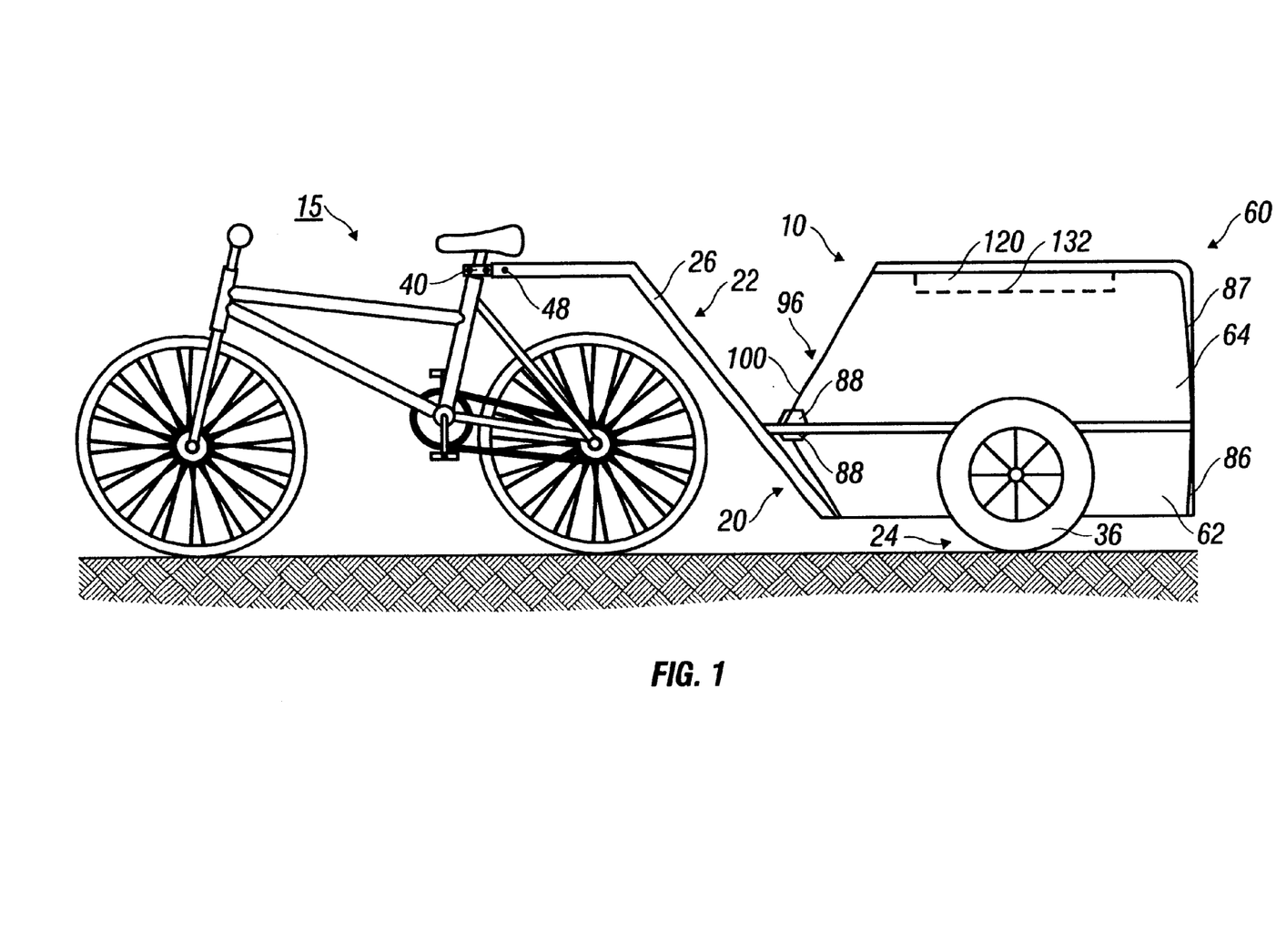
FIG. 1 is a side elevational view of the present invention showing the clamshell-style camping trailer in a closed traveling configuration.
Figure 2:
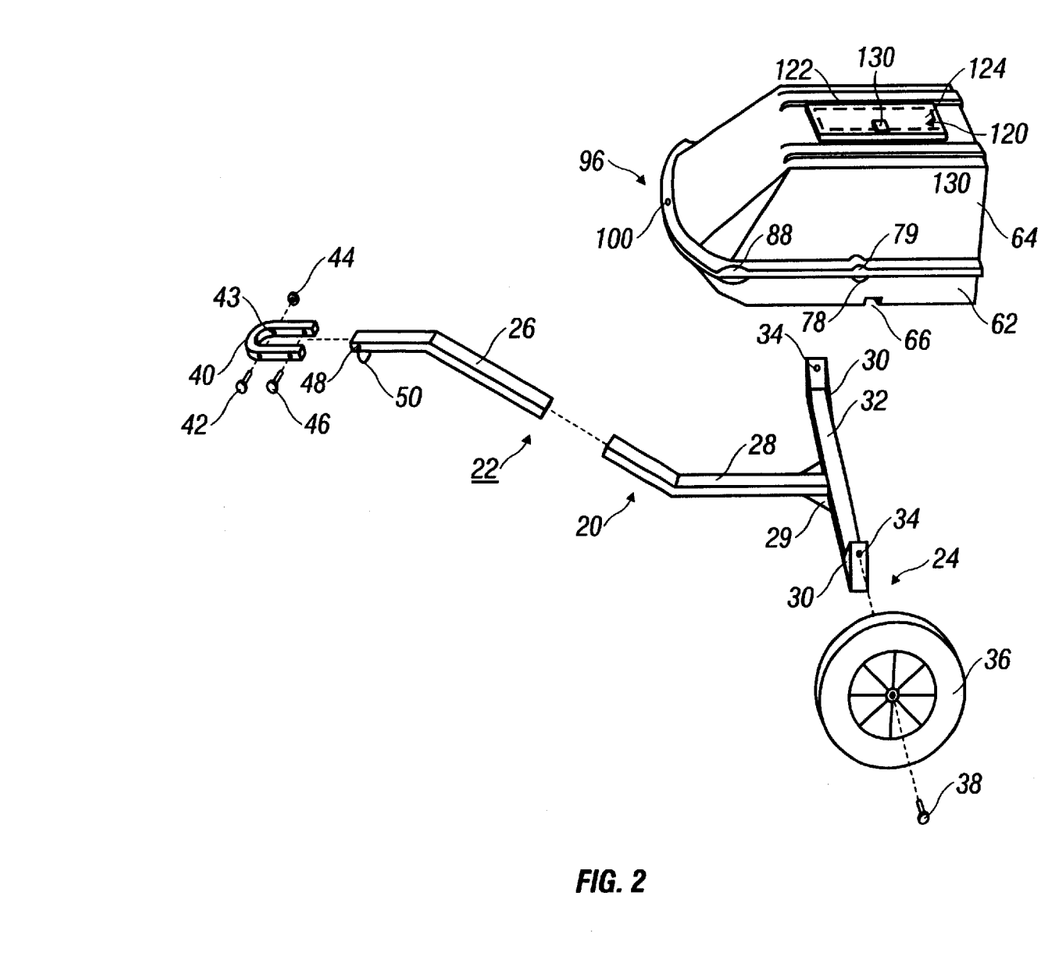
FIG. 2 shows an exploded perspective view of a frame assembly and the clamshell-style camping trailer in the closed traveling configuration.
Figure 6:
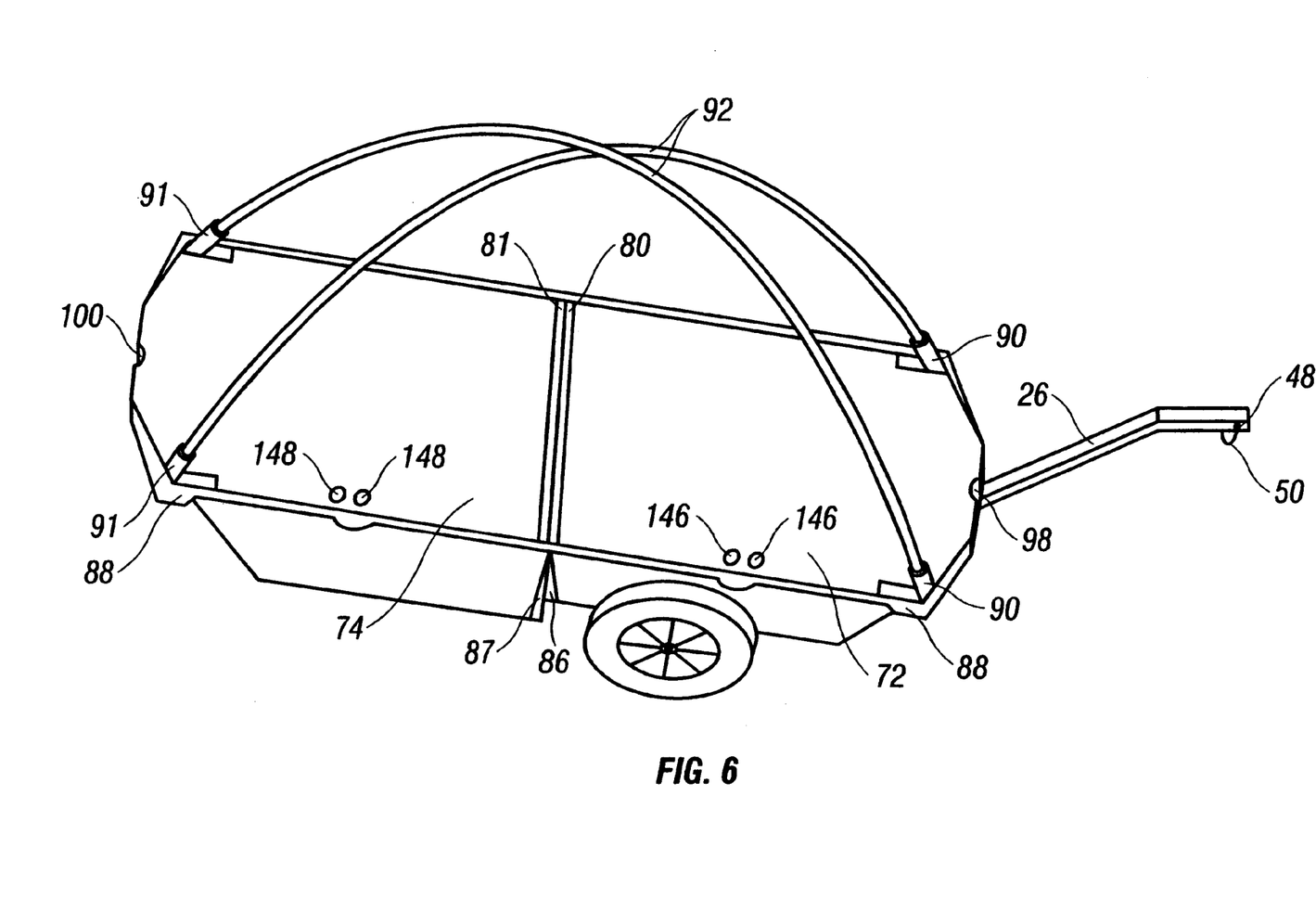
FIG. 6 is a perspective view of the clamshell-style camping trailer, according to the present invention, showing tent poles deployed above sleeping decks that are supported by the lower and upper shells.
Figure 7:
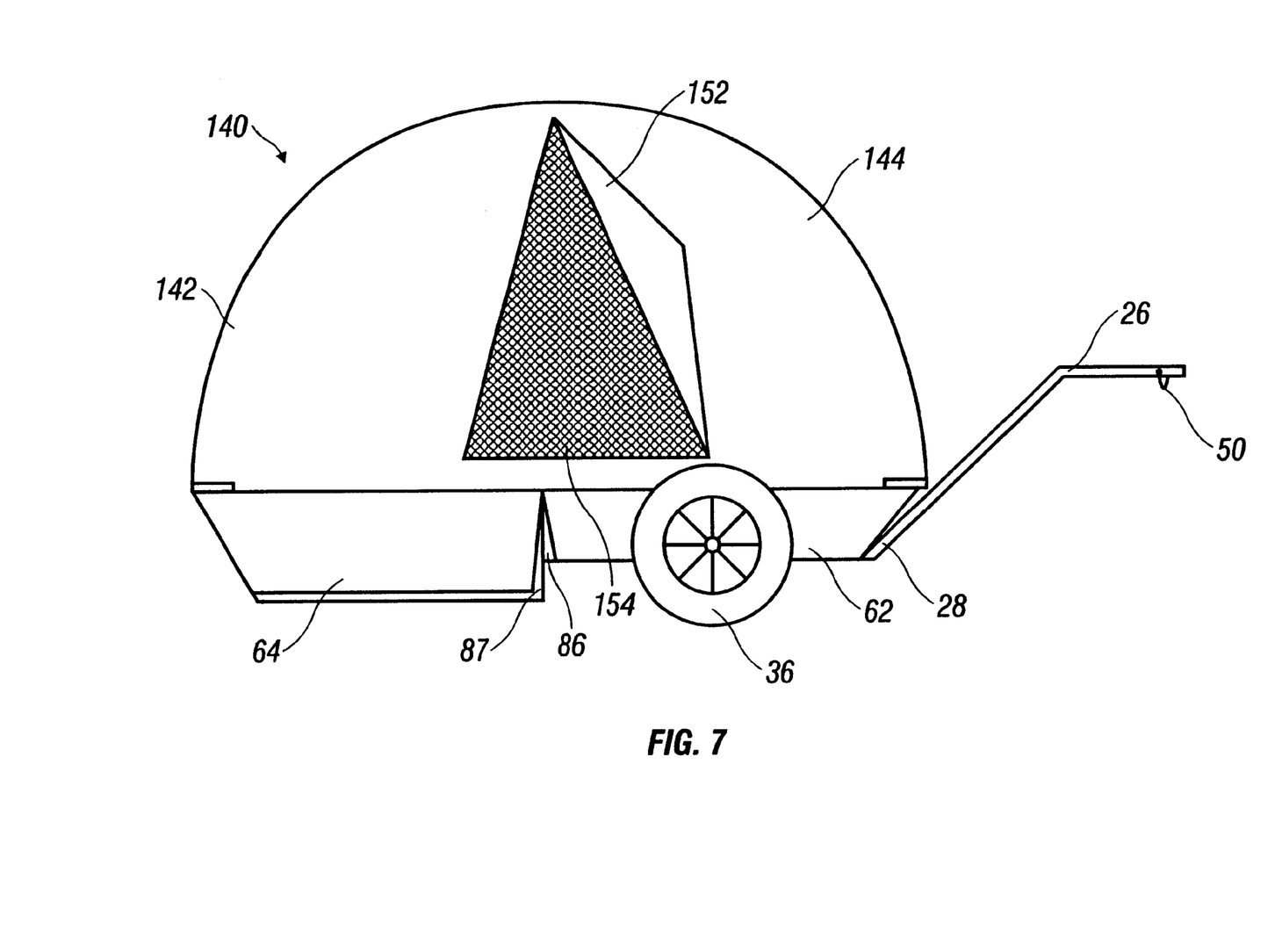
FIG. 7 is a side elevational view of the clamshell-style camping trailer in open or camping configuration with a tent cover positioned to protect a sleeping enclosure.

Referring to the drawings wherein like numbers refer to like parts throughout the several views, FIG. 1 shows a preferred embodiment of the bicycle camper trailer 10. The trailer includes a wheeled chassis 20, and a body as a camper compartment 60. FIG. 2 provides further detail in an exploded view of parts of the chassis 20 that includes a frame assembly 22 and wheel assembly 24. The frame assembly 22 comprises a detachable tongue 26 and a main frame 28, shaped substantially like a horizontal T. Axle mounts 30 are rigidly attached, in vertical orientation, at each end of the cross bar 32 of the T. The axle mounts 30 are sufficiently long to provide ground clearance for the main frame 28 and to ensure sleeping decks 72,74 (see FIG. 6) are horizontal when an upper shell 64 is open, resting flat on the ground, in the camping configuration as shown in FIG. 6 and FIG. 7.

The axle mounts 30, that form part of the wheel assembly 24, are metal, preferably constructed of steel or aluminum "C" channel. Axle nuts 34, welded to the inside of the axle mounts 30, facilitate quick removal and installation of wheels 36 using mounting means, such as connecting bolts 38. The main frame 28 has a welded gusset 29 on the bottom of the intersection of the "T" for support. The longitudinal portion of the main frame 28 is bent to provide a convenient attachment point for the detachable tongue 26 extending between the main frame 28 and a hitch 40 that connects the frame assembly 22 to the towing bicycle 15. The detachable tongue 26 is sufficiently long and contoured to provide adequate clearance from the rear wheel of the bicycle 15 while ensuring the trailer 10 is parallel to the ground for towing. To provide secure attachment and some shock absorption, the hitch 40 is preferably constructed from a hard wearing resilient material, such as reinforced rubber, in the form of a strip of material sized to support the camper trailer 10 for bicycle towing. In one suitable embodiment the hitch may be about 30 cms (12 inches) long, about 2.0 cm (⅞ inch) wide and about 0.9 cm (⅜ inch) thick. In a convenient method of attaching the camper trailer 10 to a bicycle 15 the hitch 40 folds in half, wraps around the seat post of the bicycle and the two halves are joined together preferably using a bolt 42 and nut 44 through a mounting hole 43 of about 0.8 cm (5/16 inch). The hitch 40 preferably connects to the detachable tongue 26 via hitch quick disconnect pin 46 through a tongue mounting hole 48. A bicycle lock securing ring 50 may be welded close to the hitch 40 to secure the detachable tongue 26 and attached trailer 10 to the bicycle 15 or a bicycle rack when the bicycle 15 and trailer 10 are unattended. Two molded plastic wheels 36, having a diameter of about 32 cm (12½ inches), are connected via 12.5 mm (½ inch) connecting bolts 38 to axle mounts 30 at either end of the crossbar 32. The wheels 36 are made of soft rubber and are air filled to absorb shock and reduce noise. Further, the wheels 36 are equipped with standard ball bearings to reduce friction.

Figure 3:
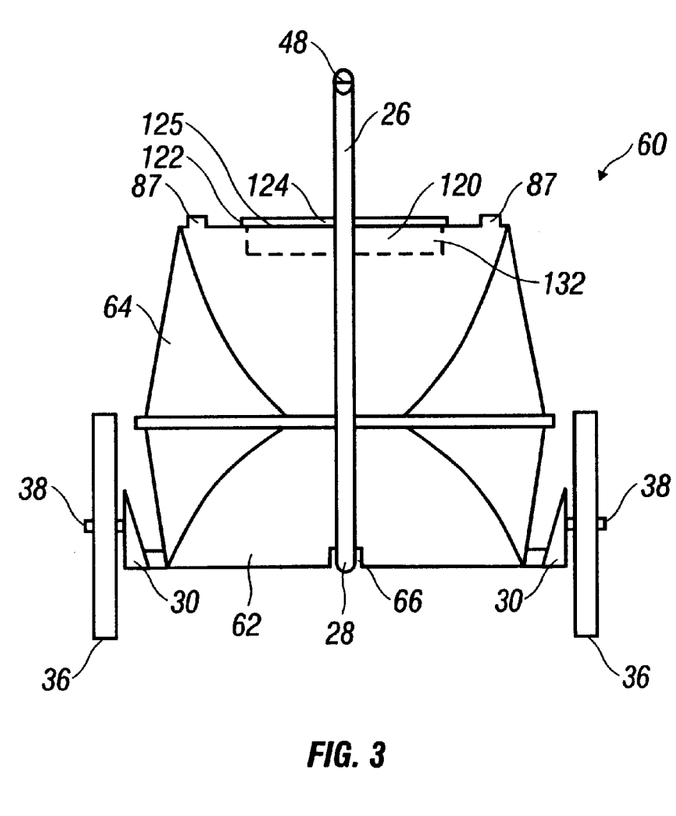
FIG. 3 is an elevational view taken from the front of the clamshell-style camping trailer, according to the present invention, showing a tongue member used to attach the trailer to a towing bicycle.
Figure 4:
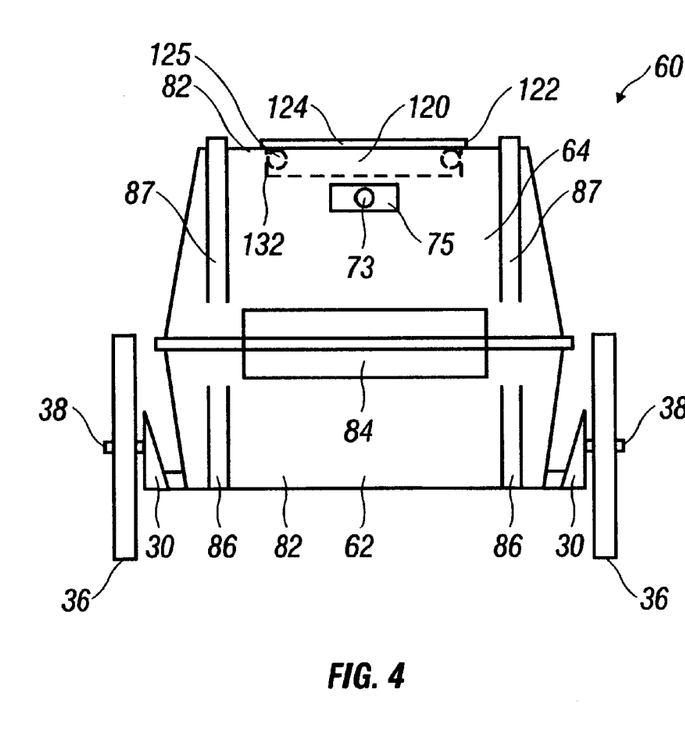
FIG. 4 is an elevational view taken from the rear of the clamshell-style camping trailer in its closed traveling configuration.

As shown in FIGS. 3 and 4, the camper compartment 60 of the bicycle camper trailer 10 includes two clamshell-style sections 62,64 capable of pivotal movement of the one relative to the other. The camper compartment 60 comprises a lower shell 62 and the upper shell 64 each molded using vacuum forming techniques. The molded shells 62,64 have a preferred wall thickness of about 6.5 mm (0.25 inch). Preferred molding materials include composite materials and ABS plastic, particularly UV resistant ABS plastic.

The bottom of the lower shell 62 includes a "T" shaped channel (see FIG. 5) 66 to accommodate the main frame 28, with secure attachment of the frame 28 in the channel 66 of the lower shell 62 using a suitable means of attachment such as riveting. The top edge 68 of the lower shell 62 has a molded, upper lip 70 on both sides and across the front to support a lower sleeping deck 72. The lower sleeping deck 72 is secured to the lower shell 62 via interference-type fasteners such as hook and loop-type fasteners. A shell support tube, in the form of a rigid brace 76, is attached to each side of the lower shell 62 via shell support tube or rigid brace brackets 78 molded into the side of the lower shell 62 at the approximate mid-point of each side or, in the case of a preferred embodiment, about 48 cm (19 inches) from the back side wall 82 (see FIG. 5). The rigid brace 76 prevents the sides of the lower shell 62 from bowing out under weight and keeps the lower sleeping deck 72 from sagging.

Figure 5:
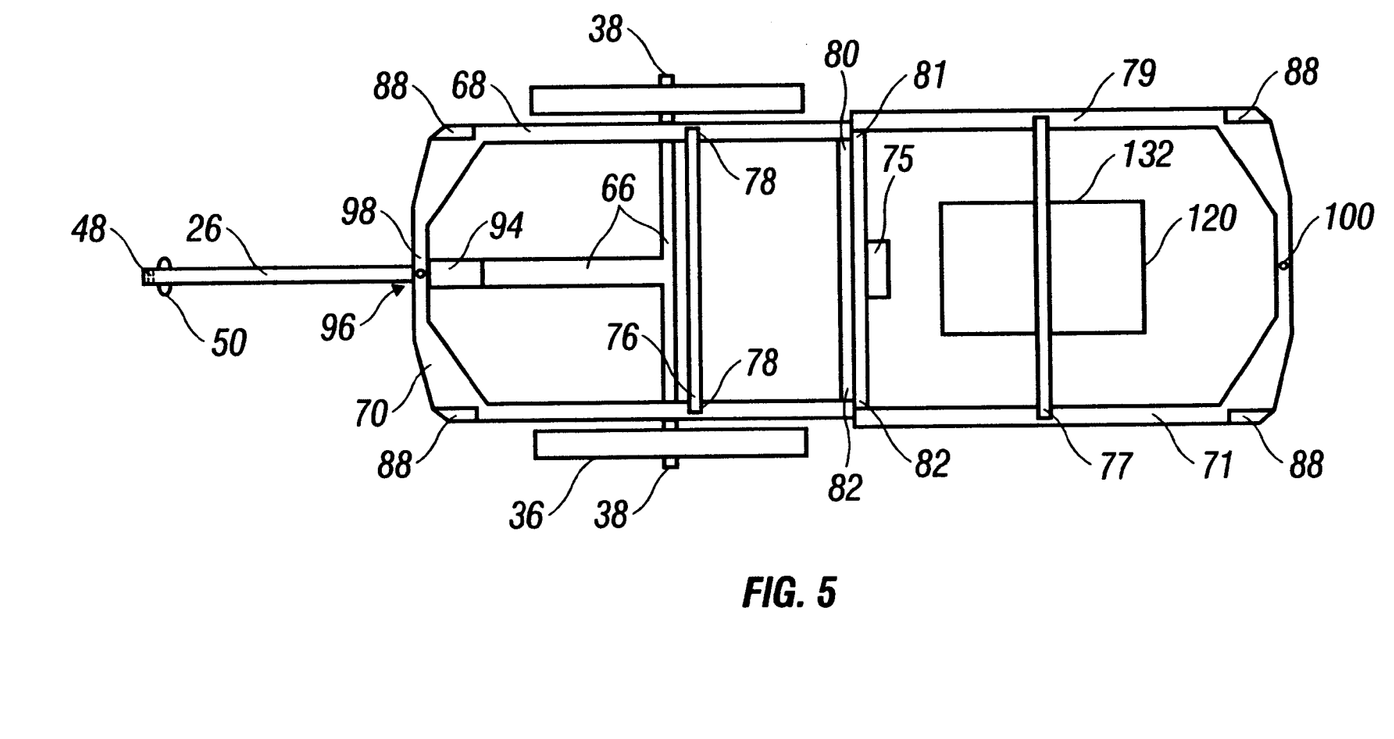
FIG. 5 provides a plan view of the clamshell-style camping trailer in open or camping configuration with a upper shell pivoted away from a lower shell.

As shown in FIG. 5, a metal "L" shaped angle brace 80, secured to the inside of the aft bulkhead 82 of the lower shell 62, provides stiffness to the shell 62 while supporting an edge of lower sleeping deck 72. The angle brace 80 provides a secure surface for coupling a piano hinge 84 (see FIG. 4) that connects the lower shell 62 to the upper shell 64. The aft bulkhead 82 of the lower shell 62 has two molded reinforcing ribs 86 running vertically from top to bottom to provide stiffness and act as stops for abutment of corresponding ribs 87 formed in the upper shell 64 when the trailer 10 is in the camping configuration (see FIG. 6 and FIG. 7). The piano hinge 84 is long enough to span the distance between the two reinforcing ribs 86 of the lower shell with sufficient pivotal movement to allow the upper and lower shell aft ribs 86,87 into engaging abutment with each other in the camping configuration. Two recesses 88, molded into the forward corners of the lower shell 62, accommodate tent pole attachment fittings 90.

The tent pole attachment fittings 90, shown in FIG. 6, may be constructed of aluminum tubing, approximately 5 cm (2.0 inches) long, with an internal diameter of approximately 1.0 cm (⅜ inch) or sufficient to accommodate the outside diameter of the tent poles 92. Tent pole attachment fittings 90 are pivotally mounted in their recesses 88 to pivot between a raised position and a stowed position that is substantially flush with the sleeping deck 72 when the trailer 10 is no longer in the camping configuration.

The forward wall of lower shell 62 has a molded extension 94 (see FIG. 5) at the center point just below the molded upper lip 70 to accommodate a lock assembly 96. In one embodiment the lock assembly 96 comprises a metallic lower shell lock strike plate 98 approximately 1.25 cm (0.5 inch)×2.54 cm (1.0 inch)×0.65 cm (0.25 inch). The strike plate 98 may be formed from flat aluminum that is secured to the lower shell 62, spanning the molded extension 94 at the molded upper lip 70 to serve as a strike plate for the upper shell lock 100 when the trailer 10 is in the towed position and the lock 100 is engaged. A snap (male portion) is attached approximately eight inches from the aft bulkhead 82 on each side of the lower shell 62 just below molded upper lip 70 to correspond to the snaps (female portion) on the lower edge of the front and back wall tent. The snaps when engaged ensure that tent 142 is stretched tight and securely fastened to the lower 62 and upper 64 shells in the open camping configuration.

The upper shell 64 is approximately 7.5 cm (3.0 inches) taller than the lower shell 62. The increased height is equal to the height that the bottom of the lower shell 62 sits above the ground. This allows the upper shell 64 to rest firmly on the ground in the extended, camping configuration while providing a full length, stable, level sleeping platform 72,74 approximately 2 meters (75 inches)×0.6 meters (24 inches). A molded lip 71 positioned along the top edge of the side and forward walls functions the same as the upper lip 70 on the lower shell 62 to support a portion of the sleeping deck 74. The molded lip 71 of the upper shell 64 is slightly oversized to overlap the upper lip 70 ensuring a water tight seal between the two shells 62, 64 in the closed traveling configuration of the trailer 10. This closed configuration reveals a warning tail light or back light 73 frictionally held in a recess 75 molded in the aft bulkhead 82 of the upper shell 64. A rigid brace 77, in the form of a shell support tube, secured to each side of the upper shell 64, prevents the sides of the upper shell 64 from bowing out under weight and keeps the upper sleeping deck 74 from sagging. The rigid brace 77 mounts in shell support tube brackets 79 molded into the approximate mid-point of the side of the upper shell 64 which, in a preferred embodiment may be about 48 cm (19 inches) from the aft bulkhead 82.

A metal "L" shaped angle brace 81, secured to the inside of the aft bulkhead 82 of the upper shell 64, provides stiffness to the shell 64 while supporting the aft bulkhead 82 of upper sleeping deck 74. The angle brace 81 provides a secure surface for coupling the other side of the piano hinge 84 that connects the upper shell 64 to the lower shell 62. Two vertical ribs 87 are molded into the back wall of the upper shell 64 (see FIG. 4). The vertical ribs 87 are in line with the vertical ribs 86 on the lower shell 62. The upper vertical ribs 87 taper from about 0.3 cm (⅛ inch) in height at the piano hinge 84 edge to approximately 1.0 cm (¾ inch) in height at the top of the upper shell 64 and extending horizontally from the front to the back of the upper shell 64 to provide stiffness.

FIGS. 2,3 and 4 show an accessory compartment 120, in the top of the upper shell 64, that may be in the form of a pouch 132. Access to accessory compartment 120 is via a hole to form an access hatch 122 cut out of the top of the upper shell 64. A hinged lid provides a hatch door 124 made of the same material as the lower and upper shells 62,64 to cover the access hatch 122. Preferably the dimensions of the hatch door 124 measure approximately 1.3 cm (½ inch) deep, 46 cm (18 inches) long, having width variation from 19.5 cm (7½ inches) wide at the aft end to 16.5 cm (6½ inches) wide at the front end. The hatch door 124 is attached to the upper shell 64 preferably using hinges, for example, and rivets (not shown). A hatch door lock 130 is attached to the hatch door 124 allowing it to be locked to the upper shell 64. The lock 130 may be accommodated in a recess formed in the top surface of the hatch door 124 so that the lock 130 does not extend outwardly from the hatch door 124. A sealing lip 125, about 0.6 cm (¼ inch), is molded into the upper shell 64 around the access hatch 122 to engage the closed hatch door 124 providing a water tight seal between the hatch door 124 and upper shell 64. The accessory compartment 120 may include a pouch 132 of sewn nylon approximately 7.5 cm (3 inches) deep and sized to fit the lip 125 of the access hatch 122. The nylon pouch 132 is connected around the access hatch 122 using interference fasteners such as hook and loop type fasteners sewn to the outside circumference of the pouch 132 and glued to the inside the edge of the access hatch 122. The pouch 132 has a small cut out portion on the left side to allow the lock 130 to engage the upper shell 64. The upper shell lock 100 is mounted to upper shell 64 molded lip 71 directly over the lower shell 62 molded extension 94. Specifically, the upper shell lock 100 engages the lower shell lock strike plate 98 when the trailer 10 is in the towed configuration.

The tent assembly 140, shown in FIGS. 6 and 7, includes a lightweight tent 142 and fiberglass tent poles 92. Light weight, rip-stop, fire retardant nylon fabric provides a preferred tent material. Preferably the nylon fabric is also protected against UV damage and is water repellant. The tent 142 is a standard "dome" shape including a symmetrical tent front 144 and back section attached, typically by sewing, to two symmetrical end sections. The tent 142 is sufficient in size so as to fit around the circumference of the upper 64 and lower shells 62 in the open camping configuration. The tent 142 is preferably about 1.0 meter (45 inches) in height from the sleeping deck 72,74 to the top of the tent 142. A zippered tent flap 152 may be sewn into the tent front 144. A first substantially horizontal zipper 154 approximately 90 cm (36 inches) long and a second zipper 156 approximately 110 cm (42 inches) long make up the opening (FIG. 7). Sewn to the inside of the tent front 144 is a zippered mesh flap in the same shape and size as the zippered tent flap 152. The zippered mesh provides a barrier against entry of insects and other undesirable pests when the tent flap 152 has been opened. Two flexible tent poles 92 sufficient in length to connect to each end of the upper 64 and lower 62 shells, slide into tent pole attachment fittings 90 of the lower shell 62 and tent pole attachment fittings 91 of the upper shell 64. The tent poles 92 cross in the middle with one pole connected to the front of the lower shell 62 and the back of the upper shell 64 and vice-versa. The tent poles 92 break down into 24" lengths for storage and are held together with shock 0.3 cm (⅛ inch) cord when assembled. Snaps on the front and back side of the tent 142 secure it to the upper and lower shell 62,64 to keep tent assembly tight. Two sleeping decks 72, 74 are constructed of hard board about 0.65 cm (¼ inch) thick and cut to fit the inside dimensions of the upper and lower shells 62,64 and rest on molded lips 70,71 and "L" shaped angle braces 80,81. The sleeping decks 72,74 are secured to the molded lips 70,71 of the upper and lower shells 62,64 using interference fasteners such as hook and loop type fasteners. Finger holes 146,148 are drilled into the sleeping deck 72,74 to serve as hand holds.

The bicycle camper trailer 10, according to the present invention, is used in a manner similar to other bicycle trailers in the towed configuration as shown in FIG. 1. The hitch 40 is first connected to the seat post of a bicycle 15 by wrapping the hitch 40 around the lower portion of a bicycle seat post and securing it with bolt 42 and lock nut 44. The "pig tail" end of the hitch 40 is then inserted into the tongue mounting hole 48 in the end of the detachable tongue 26 and secured via the hitch quick disconnect pin 46 inserted through the tongue mounting hole 48. The trailer 10 is then towed by pedaling the bicycle 15 in standard fashion. The size, shape and design of the trailer 10 ensures that the rider will have complete, unencumbered maneuverability throughout the entire range of motion of all bicycle operations.

The trailer 10, in the towed configuration, acts as a weatherproof storage compartment 60. Access to the storage compartment 60 is accomplished by disengaging upper shell lock 100 and rotating upper shell 64 one hundred and eighty degrees toward the aft portion of the trailer 10, allowing it to rest on the ground. Sleeping decks 72, 74 can then be lifted via finger holes 146,148 to permit access to the interior portion of the upper 64 and lower 62 shells.

An accessory compartment 120 is installed in the top of the upper shell 64 to carry small, lightweight items such as wallets, gloves or maps. Access to the accessory compartment 120 is by disengaging the hatch door lock 130 and rotating the accessory compartment lid, i.e. the hatch door 124 ninety degrees. The nylon accessory compartment bag or pouch 132 can be removed from inside the upper shell 64 by pulling it free of the interference fasteners around the upper circumference of the access hatch 122. Alternatively, the accessory compartment 120 may be opened from inside the upper shell 64, with the trailer 10 in the camping configuration, by providing an enterable closure in the bottom of the pouch 132.

In the camper configuration (see FIG. 6), the trailer 10 is placed on flat level ground. The upper shell 64 is opened as described above and rests flat on the ground. With the upper shell 64 open, the two sleeping decks 72, 74 form a stable, level sleeping surface.

The tent assembly 140 provides the occupant protection from the elements. Tent 142 is erected by first rotating the four tent pole attachment fittings 90,91 from the stowed, horizontal positioning to the vertical position. Two fiberglass tent poles 92 are erected by connecting the five short sections, end to end thus creating two long tent poles 92. Each short section of the tent poles 92 has a metal connector attached to one end to accept the next section. All five sections are connected via elastic shock cord running through the center hole of the poles 92. The shock cord is sufficiently stretchable to allow the poles 92 to be assembled or disassembled and still held firmly together, end to end when connected together. The shock cord is held in place by a knot on each end preventing it from sliding through the hole in the center of the poles 92. On end of erected tent pole 92 being inserted into tent pole attachment fitting 90, the pole 92 is then bent to form an arc and the other end is inserted into attachment fitting 91. The other tent pole 92 is installed in the same fashion with one end inserted into attachment 90 and the other end into attachment 91. The two poles 92, installed as shown in FIG. 6, form the frame to support the tent 142. The tent poles 92 are crossed at the top to increase stability by exerting force outward from attachment fittings 90,91. The tent 142 is then installed over the tent poles 92 in standard "pillow case" fashion. The opening at the bottom of the tent 142 is slid over the tent poles 92 and stretched downward toward the upper and lower shells 62,64. Interference fasteners such as hook and loop fasteners sewn to the outside of each lower corner of the tent 142 may then be stretched tight below molded lips 70,71 of the upper and lower shells 62,64 preventing the tent 142 from riding up on the poles 92. Four tent snaps located on the bottom edge of the forward and rear wall of the tent 142 are connected to corresponding male snaps secured just below molded lips 70,71 of the upper and lower shells 62,64 pulling the tent sides tight. The tent 142 is accessed by opening zippered tent flap 152 and pulling it back. Interference fasteners or friction fasteners or tie strings hold the flap open as desired. Similar fasteners may hold the mesh netting in open or closed position behind the zippered tent flap 152.

With the tent 142 erected the occupant has approximately 1.0 meter (45 inches) of sitting head room and is still able to access the storage compartment 120 in the upper and lower shells 62,64. The accessory compartment 120 can be accessed from inside upper shell 64 by releasing the fastener that secures it in place.

The tent 142 may be disassembled by reversing the procedure described above. Once disassembled, the tent 142 and tent poles 92 are stored in a nylon tent bag and placed in either the upper or lower shell 62,64 for transportation.

The bicycle camper trailer 10 can be used as standard utility trailer by removing the sleeping decks 72,74 and the tent assembly 140, in order to provide ample storage for transporting any manner of objects.

The trailer 10 can be stored in the vertical position, resting on the aft bulkheads 82,83 of upper and lower shells 62,64 to reduce the footprint if necessary. The detachable tongue 26 can be removed by removing bolt 42 and nut 44 and sliding the tongue 26 off the main frame 28 to further reduce the vertical footprint when the trailer 10 is stored in the vertical position or for shipping.

Although the previous description refers to particular materials, for construction of various parts of preferred embodiments of the invention, it will be understood that material substitution is appropriate provided the materials selected satisfy, e.g. the load bearing requirements of the supporting chassis and the support, protection and aesthetics of the clamshell-style compartments.

A clamshell-style camping trailer and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

Industrial Applicability

The present invention finds applicability in the camping industries.

What is claimed and desired to be secured by Letters Patent is as follows:

1. A clamshell-style camping trailer adapted to be pulled by a bicycle, said camping trailer comprising:
   a wheeled chassis having a camper compartment mounted thereupon and a tongue member coupled thereto for connection to a towing bicycle, said compartment being transformable between a traveling configuration and an open configuration;
   said camper compartment having at least two clamshell-styled bodies, each of said bodies being configured to matingly engage the other for configuring said camper compartment into said traveling configuration; and
   at least one of said at least two clamshell-styled bodies having a closure member for forming a separate cargo space within each of said bodies so that said bodies may be moved relative to one another without contents contained in said cargo spaces spilling therefrom:
      said at least two clamshell-styled bodies being a top body and a bottom body; said top body having an access hatch for permitting access to said cargo space within said top body in both said traveling configuration and said open configuration;
      a hatch door for covering said access hatch; and
      a pouch located interiorly of said access hatch and having a mouth positioned about said access hatch, said pouch forming a separate pouch space within a cargo space of said top body.

2. The invention as recited in claim 1, wherein said closure member further comprises an interference-fit securement, said interference-fit securement being configured to releasably attach said closure member to said camping trailer.

3. The invention as recited in claim 1, further comprising:
   a substantially rigid brace extending across an open portion of at least one of said at least two clamshell-styled bodies for resisting deflections in said at least one of said at least two clamshell-styled bodies; and
   said closure member having an interference-fit securement, said interference-fit securement being configured to releasably attach said closure member to said brace.

4. The invention as recited in claim 1, further comprising:
   at least one hinge connected between said at least two clamshell-styled bodies so that one of said at least two clamshell-styled bodies pivots away from the other of said at least two clamshell-styled bodies when being transformed from the traveling configuration to the open configuration.

5. The invention as recited in claim 4, further comprising:
   an L-shaped angle brace positioned interiorly within one of said cargo spaces at a back side wall of one of said at least two clamshell-styled bodies substantially adjacent to said at least one hinge, an exterior surface of a vertical leg of said L-shaped angle brace being flush with an interior surface of said one of said at least two clamshell-styled bodies and a top surface of a horizontal leg of said L-shaped angle brace being level with an upper lip of said one of said at least two clamshell-styled bodies.

6. The invention as recited in claim 5, further comprising:
said top surface of said horizontal leg of said L-shaped angle brace providing a portion of a support surface upon which a substantially flat sleeping deck is supported in said camping configuration.

7. The invention as recited in claim 4, further comprising:
said at least two clamshell-styled bodies being a top body and a bottom body and said at least two clamshell-styled bodies adapted to establish a camping configuration when said top body is maximally pivoted with respect to said bottom body; and
each of said top and bottom bodies having an upper opening when in said camping configuration, each of said upper openings being defined by an upper lip and each of said upper lips being substantially level with one another in said camping configuration.

8. The invention as recited in claim 7, further comprising:
said top body having a height greater than a height of said bottom body; and
said bottom body being supported on said wheeled chassis in said camping configuration and said top body being supported on an adjacent ground surface in said camping configuration, said heights of said top and bottom bodies being selected so as to maintain each of said upper lips substantially level with one another in said camping configuration.

9. The invention as recited in claim 7, wherein said top body further comprises
a recess at a back portion thereof, said recess configured to releasably receive a back light assembly.

10. The invention as recited in claim 9, further comprising:
a back light assembly insertably received in said recess.

11. The invention as recited in claim 10, wherein said recess is sized to form a friction fit with said back light assembly when said back light assembly is installed within said recess.

12. The invention as recited in claim 7, further comprising:
each of said top and bottom bodies having at least one reinforcing rib positioned exteriorly thereof for resisting deflections in said bodies.

13. The invention as recited in claim 12, further comprising:
said at least one reinforcing rib on said top body and said at least one reinforcing rib on said bottom body being arranged to abuttingly engage one another in said camping configuration for setting the substantially level orientation of said upper lips of said top and bottom bodies.

14. The invention as recited in claim 7, further comprising:
each of said closure members being a substantially planar cover, each of said substantially planar covers being adapted together to form a substantially flat sleeping deck when said top and bottom bodies are in said camping configuration.

15. The invention as recited in claim 14, further comprising:
a periphery of at least one of said substantially planar covers being shaped to conform to a shape of a mouth formed by said upper lip of at least one of said bodies upon which said at least one of said substantially planar covers is attached so that said at least one of said substantially planar covers is supported at said periphery on said mouth in said camping configuration.

16. The invention as recited in claim 15, further comprising:
a substantially rigid brace extending across said mouth formed by said upper lip of at least one of said bodies upon which said at least one of said substantially planar cover is attached; and
a support surface of said substantially rigid brace abuttingly engaging said substantially planar cover for lending additional support thereto in said camping configuration.

17. The invention as recited in claim 15, wherein said mouth further comprises:
a flange projecting beyond said periphery of said at least one of said substantially planar covers so that said at least one of said substantially planar covers is located interiorly to an external periphery of said flange in both said travel configuration and said camping configuration.

18. The invention as recited in claim 17, further comprising:
a lock assembly at least partially contained in said flange for releasably locking said at least two clamshell-styled bodies in said traveling configuration.

19. The invention as recited in claim 1, wherein said tongue member is telescopically constructed to facilitate raising and lowering of a top portion of said tongue member to establish proper positioning of said top portion for attachment to a towing bicycle.

20. The invention as recited in claim 1, wherein said pouch further comprises
a second opening opposite said access hatch for providing access into said pouch space from within said cargo space of said top body.

21. The invention as recited in claim 20, further comprising:
a zipper closure at said second opening for selectively closing and opening said second opening from within said cargo space of said top body.

22. The invention as recited in claim 1, further comprising:
at least one tent pole coupled to said camping trailer for supporting a tent above said camping trailer in said camping configuration.

23. A clamshell-style camping trailer adapted to be pulled by a bicycle, said camping trailer comprising:
a wheeled chassis having a camper compartment mounted thereupon and a tongue member coupled thereto for connection to a towing bicycle, said compartment being transformable between a traveling configuration and an open configuration;
said camper compartment having at least two clamshell-styled bodies, each of said bodies being configured to matingly engage the other for configuring said camper compartment into said traveling configuration;
at least one of said at least two clamshell-styled bodies having a closure member for forming a separate cargo space within each of said bodies so that said bodies may be moved relative to one another without contents contained in said cargo spaces spilling therefrom;
a tent pole receiver coupled to one of said at least two clamshell-styled bodies, said tent pole receiver configured to secure a tent pole to said one of said at least two clamshell-styled bodies for supporting a tent cover above said clamshell-style camping trailer in said camping configuration; and said tent pole receiver being coupled to one of said at least two clamshell-styled bodies by a pivot connection, said pivot connection enabling transformation of said tent pole receiver between a substantially upright configuration for receiving a tent pole and a stored configuration assumable when said tent pole receiver is not in use.

24. The invention as recited in claim 23, further comprising:

said tent pole receiver being coupled to one of said at least two clamshell-styled bodies by a pivot connection, said pivot connection enabling transformation of said tent pole receiver between a substantially upright configuration for receiving a tent pole and a stored configuration assumable when said tent pole receiver is not in use.

25. The invention as recited in claim 23, further comprising:

at least one tent pole received in said tent pole receiver for supporting a tent above said camping trailer in said camping configuration.

26. The invention as recited in claim 25, further comprising:

said at least one tent pole having two end portions, each of said two end portions received in a tent pole receiver on said camping trailer; and a mid-section of said at least one tent pole being arched over said camping trailer thereby forming an rib structure for supporting a tent above said camping trailer in said camping configuration.

27. The invention as recited in claim 23, further comprising:

a tent supported upon said at least one tent pole for establishing an enclosure about a substantially flat sleeping deck of said camping trailer; and said tent having a lower portion secured about a top portion of said at least two clamshell-styled bodies in said camping configuration.

28. The invention as recited in claim 27, wherein said lower portion of said tent is secured about said top portion using snaps.

29. A clamshell-style trailer adapted to be pulled by a vehicle, said trailer comprising:

a wheeled chassis having a closeable compartment mounted thereupon and a tongue member coupled thereto for connection to a towing vehicle, said compartment being transformable between a traveling configuration and a camping configuration;

said compartment being established utilizing two clamshell-styled bodies, each of said bodies being configured to matingly engage the other for configuring said compartment into the traveling configuration;

said two clamshell-styled bodies having a closure member for forming a separate cargo space within each of said bodies so that said bodies may be moved relative to one another without contents contained in said cargo spaces spilling therefrom;

said two clamshell-styled bodies configured as a top body and a bottom body;

said top body having an access hatch for permitting access to said cargo space within said top body in the traveling configuration;

a hatch door for covering said access hatch; and a pouch located interiorly of said access hatch and having a mouth positioned about said access hatch, said pouch forming a separate pouch space within a cargo space of said top body.

30. The invention as recited in claim 29, wherein said closure member further comprises an interference-fit securement, said interference-fit securement being configured to releasably couple said closure member to said wheeled chassis.

31. The invention as recited in claim 29, further comprising:

a hinge connected between said two clamshell-styled bodies so that one of said two clamshell-styled bodies pivots away from the other when being transformed from the traveling configuration to the camping configuration.

32. The invention as recited in claim 29, further comprising:

a L-shaped angle brace positioned interiorly within one of said cargo spaces at a back side wall of one of said two clamshell-styled bodies substantially adjacent to said hinge, an exterior surface of a vertical leg of said L-shaped angle brace being flush with an interior surface of said clamshell-styled body and a top surface of a horizontal leg of said L-shaped angle brace being level with an upper lip of said clamshell-styled body.

33. The invention as recited in claim 32, further comprising:

said top surface of said horizontal leg of said L-shaped angle brace establishing a portion of a support surface upon which a substantially flat sleeping deck is supported in the camping configuration.

34. The invention as recited in claim 29, further comprising:

said tongue member being telescopically constructed to facilitate raising and lowering of a top portion of said tongue member to establish proper positioning of said top portion for attachment to a towing bicycle.

35. The invention as recited in claim 29, further comprising:

at least one tent pole coupled to said trailer for supporting a tent above said trailer in the camping configuration.

36. The invention as recited in claim 29, further comprising:

a tent pole receiver coupled to one of said two clamshell-styled bodies, said tent pole receiver configured to secure a tent pole to said clamshell-styled body for supporting a tent cover above said trailer in the camping configuration.

37. A clamshell-style trailer adapted to be pulled by a vehicle, said trailer comprising:

a wheeled chassis having a closeable compartment mounted thereupon and a tongue member coupled thereto for connection to a towing vehicle, said compartment being transformable between a traveling configuration and a camping configuration;

said compartment being established utilizing two clamshell-styled bodies, each of said bodies being configured to matingly engage the other for configuring said compartment into the traveling configuration;

said two clamshell-styled bodies having a closure member for forming a separate cargo space within each of said bodies so that said bodies may be moved relative to one another without contents contained in said cargo spaces spilling therefrom;

a tent pole receiver coupled to one of said two clamshell-styled bodies, said tent pole receiver configured to secure a tent pole to said clamshell-styled body for supporting a tent cover above said trailer in the camping configuration; and said tent pole receiver being coupled to said clamshell-styled body by a pivot connection, said pivot connection enabling transformation of said tent pole receiver between a substantially upright configuration for receiving a tent pole and a stored configuration assumed when said tent pole receiver is not in use.

38. An arrangement including a bicycle and a bicycle drawn clamshell-style camping trailer, said arrangement comprising:

a bicycle;

a clamshell-style camping trailer hitch-mounted to said bicycle, said clamshell-style camping trailer further comprising:
- a wheeled chassis having a camper compartment mounted thereupon and a tongue member coupled between said bicycle and said clamshell-style camping trailer, said compartment being transformable between a traveling configuration and an open configuration; and
- said camper compartment having a top body and a bottom body, said top body having an access hatch for permitting access to a cargo space within said top body in both said traveling configuration and said open configuration.

39. The arrangement as recited in claim 38, said arrangement further comprising:

a pouch located interiorly of said access hatch and having a mouth positioned about said access hatch, said pouch forming a separate pouch space within a cargo space of said top body.

40. A clamshell-style trailer adapted to be pulled by a vehicle, said trailer comprising:

a wheeled chassis having a camper compartment mounted thereupon and a tongue member coupled between said bicycle and said clamshell-style camping trailer, said compartment being transformable between a traveling configuration and an open configuration;

said camper compartment having a top body and a bottom body, said top body having an access hatch for permitting access to a cargo space within said top body in both said traveling configuration and said open configuration; and a pouch located interiorly of said access hatch and having a mouth positioned about said access hatch, said pouch forming a separate pouch space within a cargo space of said top body.

* * * * *